US011196630B2

(12) United States Patent
Saghir et al.

(10) Patent No.: US 11,196,630 B2
(45) Date of Patent: Dec. 7, 2021

(54) CERTIFICATE-BASED AUTHENTICATION IN NETWORKS EMPLOYING SMALL CELL WIRELESS STATIONS

(71) Applicant: Verizon Patent and Licensing Inc., Arlington, VA (US)

(72) Inventors: Amir Saghir, Frisco, TX (US); Said Hanbaly, Prosper, TX (US); Thomas W. Haynes, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 16/181,672

(22) Filed: Nov. 6, 2018

(65) Prior Publication Data
US 2020/0145294 A1    May 7, 2020

(51) Int. Cl.
*H04L 12/24* (2006.01)
*H04W 12/06* (2021.01)
*H04W 76/12* (2018.01)
*H04W 84/04* (2009.01)

(52) U.S. Cl.
CPC .............. *H04L 41/12* (2013.01); *H04W 12/06* (2013.01); *H04W 76/12* (2018.02); *H04W 84/045* (2013.01)

(58) Field of Classification Search
CPC .... H04L 41/12; H04W 712/06; H04W 76/12; H04W 84/045; H04W 12/06
See application file for complete search history.

(56) References Cited

U.S. PATENT DOCUMENTS

| | | | | |
|---|---|---|---|---|
| 2008/0039086 A1* | 2/2008 | Gallagher | ............. | H04W 12/08 455/435.1 |
| 2009/0059848 A1* | 3/2009 | Khetawat | ............ | H04L 61/2514 370/328 |
| 2017/0171158 A1* | 6/2017 | Hoy | ...................... | H04L 63/164 |

OTHER PUBLICATIONS

S. Kent etc, IETF RFC 2401, "Security Architecture for the Internet Protocol", Nov. 1998.*
IETF draft "Network Access Control List (ACL) YANG Data Model draft-ietf-netmod-acl-model-10", Sep. 14, 2017.*
C. Adams, et al.: Internet X.509 Public Key Infrastructure Certificate Management Protocol (CMP). Network Working Group, Request for Comments: 4210. Sep. 2005. 95 pages.
D. Cooper, et al.: Internet X.509 Public Key Infrastructure Certificate and Certificate Revocation List (CRL) Profile. Network Working Group, Request for Comments: 5280. May 2008. 151 pages.

* cited by examiner

*Primary Examiner* — Jianye Wu

(57) ABSTRACT

At least one network device receives a first network address of a first small cell wireless station that has been registered as an authorized wireless station for network access to a target network. The at least one network device adds the first network address of the first small cell wireless station to a small cell wireless station data structure that lists a plurality of network addresses associated with a plurality of authorized small cell wireless stations, and validates, upon power-up of the first small cell wireless station, the first small cell wireless station against the small cell wireless station data structure to selectively establish a first tunnel, between the first small cell wireless station and a gateway connected to the target network, to enable network access to the target network.

20 Claims, 12 Drawing Sheets

CERTIFICATE-BASED AUTHENTICATION IN NETWORKS EMPLOYING SMALL CELL WIRELESS STATIONS

BACKGROUND

Wireless networks, such as cellular wireless networks, include geographically positioned wireless stations that provide wireless connectivity to mobile devices roaming in proximity to the base stations. Wireless stations in such cellular wireless networks are typically positioned to provide overlapping wireless coverage such that roaming mobile devices are able to maintain a connection to the network at all times.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Figure 1:
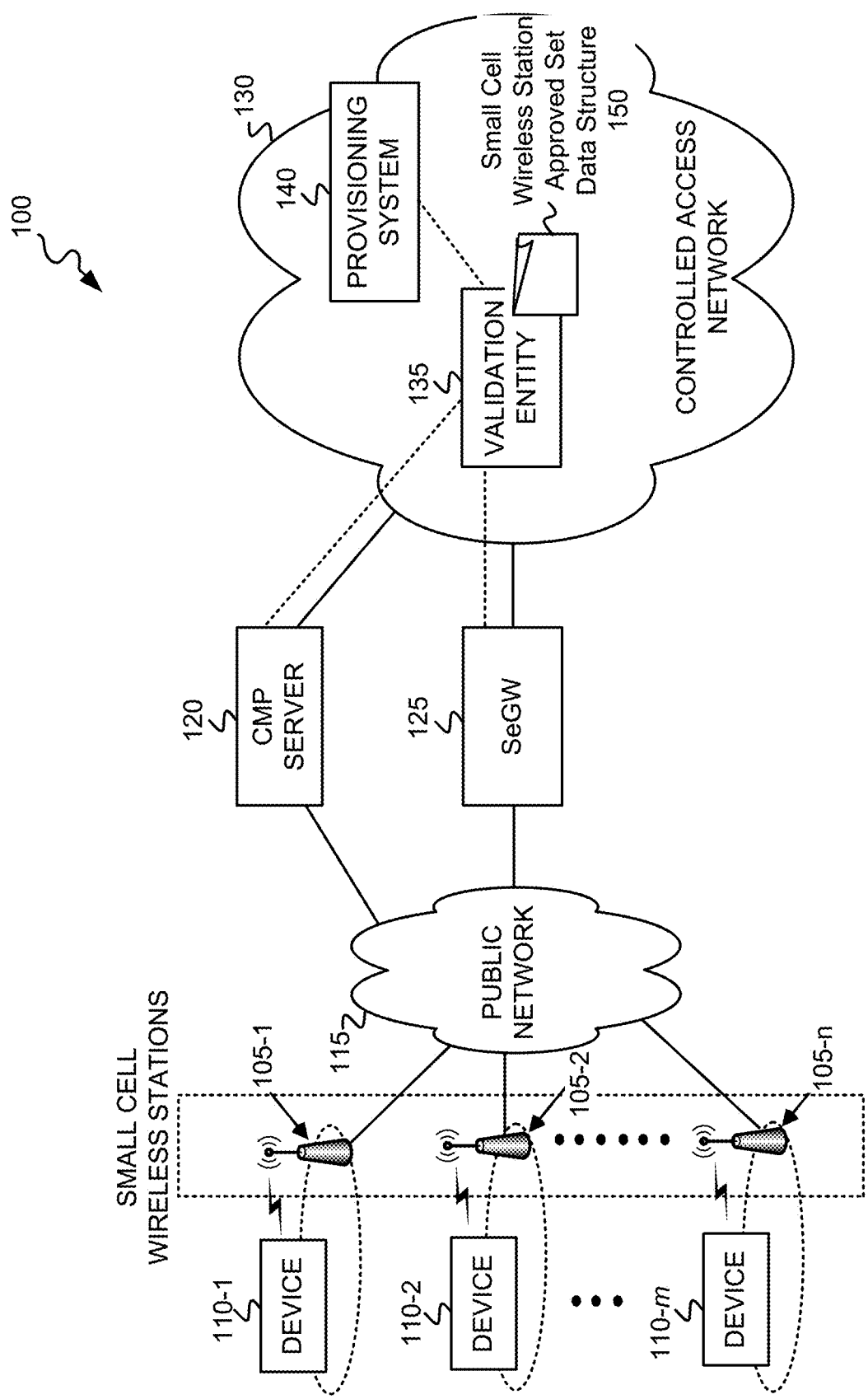
FIG. 1 depicts an exemplary network environment in which certificate-based authentication is applied to small cell wireless stations attempting to connect to a controlled access network.

FIG. 1 depicts an exemplary network environment 100 in which certificate-based authentication, using a small cell wireless station approved set data structure, is applied to small cell wireless stations attempting to connect to a controlled access network. As shown, network environment 100 may include one or more small cell wireless stations 105-1 through 105-n (where n is greater than or equal to one), one or more devices 110-1 through 110-m (where m is greater than or equal to one, and m may, or may not, equal n), a public network 115, a Certificate Management Protocol (CMP) server 120, a Security Gateway (SeGW) 125, a controlled access network 130, a validation entity 135, and a provisioning system 140.

Small cell wireless stations 105-1 through 105-n (generically referred to herein as "small cell wireless station 105" or "small cell wireless stations 105") each includes a small cellular wireless station that produces an area of wireless coverage, corresponding to a small cell, for wireless communications. Small cell wireless stations 105 may include, for example, femto access points (APs) associated with respective femtocells, or Home eNodeBs (HeNBs) associated with a Long-Term Evolution (LTE) Radio Access Network(s). Each small cell wireless station 105 may have a shorter range, and handle fewer concurrent calls/sessions, than standard cellular wireless stations (e.g., standard eNodeBs). Therefore, each small cell wireless station 105 performs the same functions as a standard wireless station but may be optimized for smaller coverage than a macro wireless station (e.g., a macro eNodeB). Such smaller coverage may include, for example, indoor applications or public "hotspots." In some implementations, small cell wireless stations 105 may be added within a geographic area in an ad-hoc fashion to provide additional wireless coverage, via controlled access network 130, that may be short term, long term, or possibly permanent. With the addition of each ad-hoc small cell wireless station 105, the small cell wireless station 105 can be registered with provisioning system 130 as a valid and approved wireless station that may permissibly connect with controlled access network 130 via SeGW 125.

Devices 110-1 through 110-m (generically referred to herein as "device 110" or "devices 110") may each include any type of electronic device that includes a wireless interface for communicating via a wireless connection with a small cell wireless station 105. Devices 110 may each include a cellular telephone; a "smart" phone; a personal digital assistant (PDA); a wearable computer; a desktop, laptop, palmtop or tablet computer; a media player; a Machine-to-Machine (M2M) device, or an "Internet of Things" (IoT) device. A user (not shown) may be associated with each device 110, where the user may be an owner, operator, administrator, and/or a permanent or temporary user of device 110.

Public network 115 may include any type of network that may interconnect with small cell wireless stations 105. In one implementation, public network 115 may include the Internet. In other implementations, public network 115 may include a telecommunications network (e.g., Public Switched Telephone Networks (PSTNs)), a wired and/or wireless local area network (LAN), a wired and/or wireless wide area network (WAN), a metropolitan area network (MAN), an intranet, an Internet Protocol (IP) Multimedia Subsystem (IMS) network, and/or a cable network (e.g., an optical cable network).

CMP server 120 may include one or more network devices that obtain operational certificates for assignment to new small cell wireless stations 105, validate small cell wireless stations 105 as they attempt to access controlled access network 130, and issue certificates to validated small cell wireless stations. CMP server 120 may validate the small cell wireless stations by comparing a network address (e.g., a Medium Access Control (MAC) address) associated with each small cell wireless station with a list of network addresses contained in a small cell wireless station approved set data structure associated with controlled access network 130.

SeGW 125 may include one or more network devices that operate to interconnect public network 115 with controlled access network 130 in a secure manner. In one implementation, SeGW 125 may permit the establishment of secure tunnels from small cell wireless stations 105 to SeGW 125 to connect the small cell wireless stations 105 with controlled access network 130.

Controlled access network 130 may include a controlled, or restricted, access network that is operated and/or administered by a particular network service provider. Controlled access network 130 may include, for example, a telecommunications network (e.g., a PSTN), a wireless Public Land Mobile Network (PLMN) or a wireless satellite network, a wired and/or wireless LAN, a wired and/or wireless WAN, a MAN, an intranet, an IMS network, and/or a cable network (e.g., an optical cable network) that has controlled, or restricted, access. In one implementation, controlled access network 130 may include a wireless PLMN or a wireless satellite network that is operated and/or administered by a particular wireless network service provider (i.e., a "carrier" or a "mobile network operator" (MNO)). In such an implementation, controlled access network 130 may be referred as a "MNO network." The PLMN may include a Code Division Multiple Access (CDMA) 2000 PLMN, a GSM PLMN, a Long-Term Evolution (LTE) PLMN and/or other types of PLMNs not specifically described herein.

Validation entity 135 may include one or more network devices that maintain a small cell wireless station approved set data structure 150 that identifies small cell wireless stations 105 that have been authorized to connect to controlled access network 130. Validation entity 135 is depicted in FIG. 1 as being connected within controlled access network 130. In other implementations, validation entity 135 may be connected within a different network (e.g., within public network 115). In one implementation, validation entity 135 may not be a stand-alone device(s), but may be a component of SeGW 125 or CMP server 120 such that SeGW 125 or CMP server 120 performs the operations of validation entity 135 that are described herein. In other implementations, validation entity 135 may be a component of an Authentication, Authorization, and Accounting (AAA) server that provides authentication, authorization, and accounting services within controlled access network 130.

Provisioning system 140 may include one or more network devices that interact with validation entity 135 to enter changes in the small cell wireless station approved set data structure. Provisioning system 140 may, for example, add identifiers (e.g., network addresses) of new small cell wireless stations, which are authorized to access the controlled access network 130, to the small cell wireless station approved set data structure. Provisioning system 140 may also, for example, remove identifiers for existing small cell wireless stations from the small cell wireless station approved set data structure 150 to prevent further access to the controlled access network 130 by the removed small cell wireless stations. Provisioning system 140 may be operated and maintained by a network service provider (e.g., a Mobile Network Operator (MNO)) associated with controlled access network 130. Provisioning system 140 is depicted in FIG. 1 as being connected within controlled access network 130. In other implementations, provisioning system 140 may be connected within a different network (e.g., within public network 115).

The configuration of the components of network environment 100 depicted in FIG. 1 is for illustrative purposes only, and other configurations may be implemented. Therefore, network environment 100 may include additional, fewer, and/or different components, that may be configured or connected differently, than depicted in FIG. 1. For example, though a single validation entity 135 is shown in FIG. 1, network environment 100 may include multiple validation entities 135, with each validation entity 135 maintaining a different small cell wireless station approved set data structure 150 for a different controlled access network 130. Alternatively, a single validation entity 135 may maintain multiple different small cell wireless station approved set data structures 150 associated with multiple different controlled access networks 130. In the case of multiple different controlled access networks 130, a different one of multiple SeGWs 125 may interconnect public network 115 with each different controlled access network 130.

Figure 2:
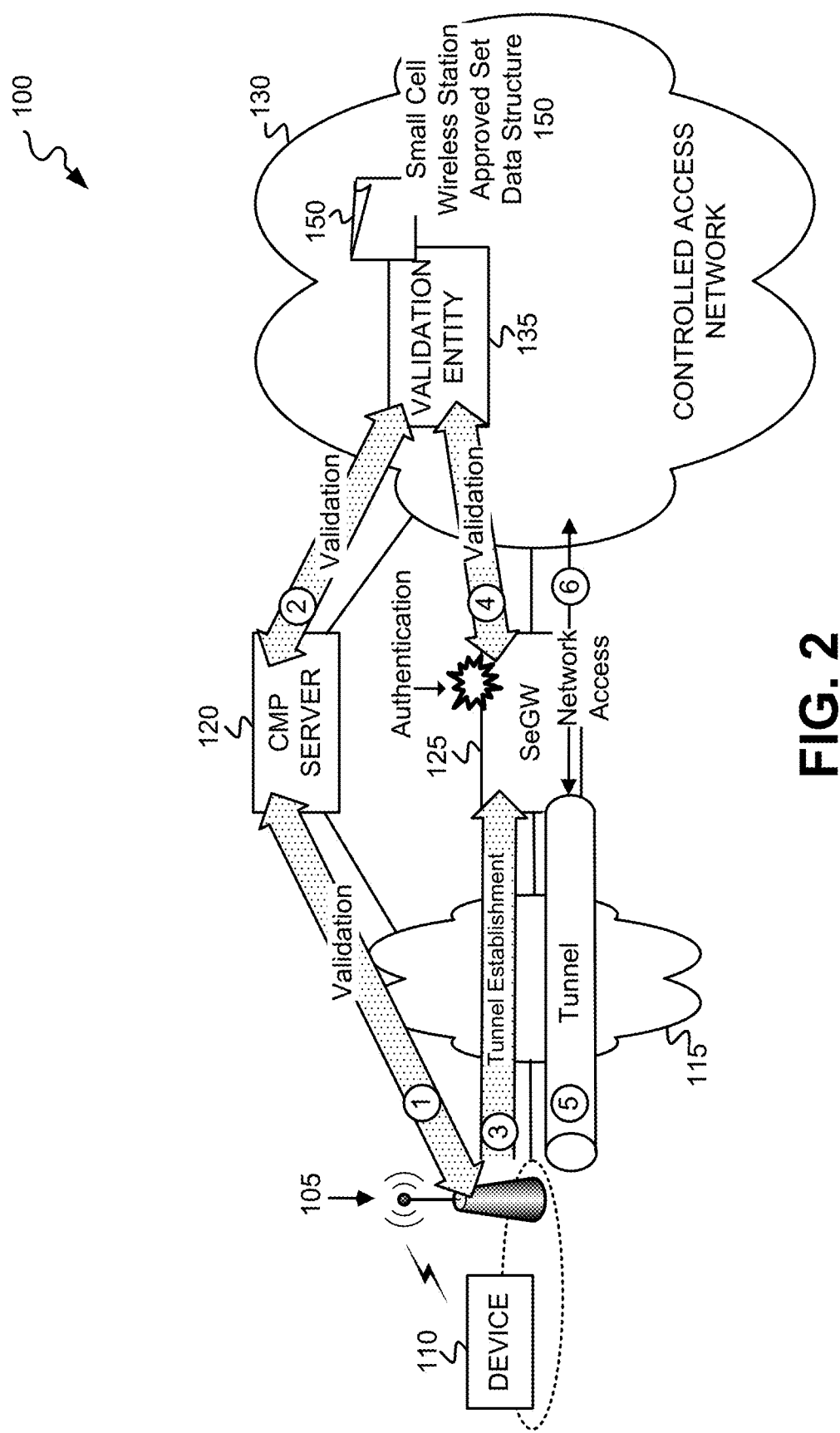
FIG. 2 depicts an overview of certificate-based authentication within the network environment of FIG. 1.

FIG. 2 depicts an overview of certificate-based authentication using a small cell wireless station approved set data structure 150 within network environment 100 of FIG. 1. As shown, the authentication process begins with the validation (shown with a "1" within a circle) of a new small cell wireless station 105 connecting to public network 115. A validation request from small cell wireless station 105 includes a network address (e.g., a MAC address) assigned to the small cell wireless station 105. CMP server 120, upon receipt of the validation request, requests validation of the network address by validation entity 135. Validation entity 135 performs the validation (shown with a "2" within a circle) by comparing the network address of the small cell wireless station 105 with a list of network addresses of authorized small cell wireless stations stored in small cell wireless station approved set data structure 150. If validation entity 135 finds a matching network address in approved set data structure 150, validation entity 135 returns a validation success notification to CMP server 120. If validation entity 135 does not find a matching network address in approved set data structure 150, validation entity 135 returns a validation failure notification to CMP server 120.

If the validation is successful, then CMP server 120 assigns an operational certificate to the requesting small cell wireless station 105, and issues the certificate to the small cell wireless station 105. Upon receipt of the certificate, small cell wireless station 105 stores the certificate for use in establishing a connection (e.g., a secure tunnel) through SeGW 125 to controlled access network 130 via public network 115.

Small cell wireless station 105 requests establishment (shown with a "3" within a circle) of a secure tunnel with SeGW 125 for connecting to controlled access network 130. The tunnel establishment request includes the small cell wireless station 105's network address and its assigned certificate. SeGW 125, upon receipt of the validation request, requests a validation of the network address received in the tunnel establishment request by validation entity 135. Validation entity 135 performs the validation (shown with a "4" within a circle) by comparing the network address of the small cell wireless station 105 with a list of network addresses of authorized small cell wireless stations stored in small cell wireless station approved set data structure 150. If validation entity 135 finds a matching network address in approved set data structure 150, validation entity 135 returns a validation success notification to SeGW 125. If validation entity 135 does not find a matching network address in approved set data structure 150, validation entity 135 returns a validation failure notification to SeGW 125.

If the validation results in a successful validation, then SeGW 125 authenticates the small cell wireless station 105 based on the certificate received in the tunnel establishment request. SeGW 125 may use existing certificate-based authentication techniques for authenticating the small cell wireless station 105. If authentication of the small cell wireless station 105 is successful, in addition to the successful validation, then SeGW 125 establishes a secure tunnel (shown with a "5" within a circle) between SeGW 125 and the small cell wireless station 105. Small cell wireless station 105 may subsequently use the secure tunnel for establishing network access (shown with a "6" within a circle) to controlled access network 130. Once connected to controlled access network 130 via the secure tunnel, wireless station 105 may operate as a small cell wireless station for enabling devices 110 to wirelessly connect with controlled access network 130 via wireless station 105.

Figure 3:
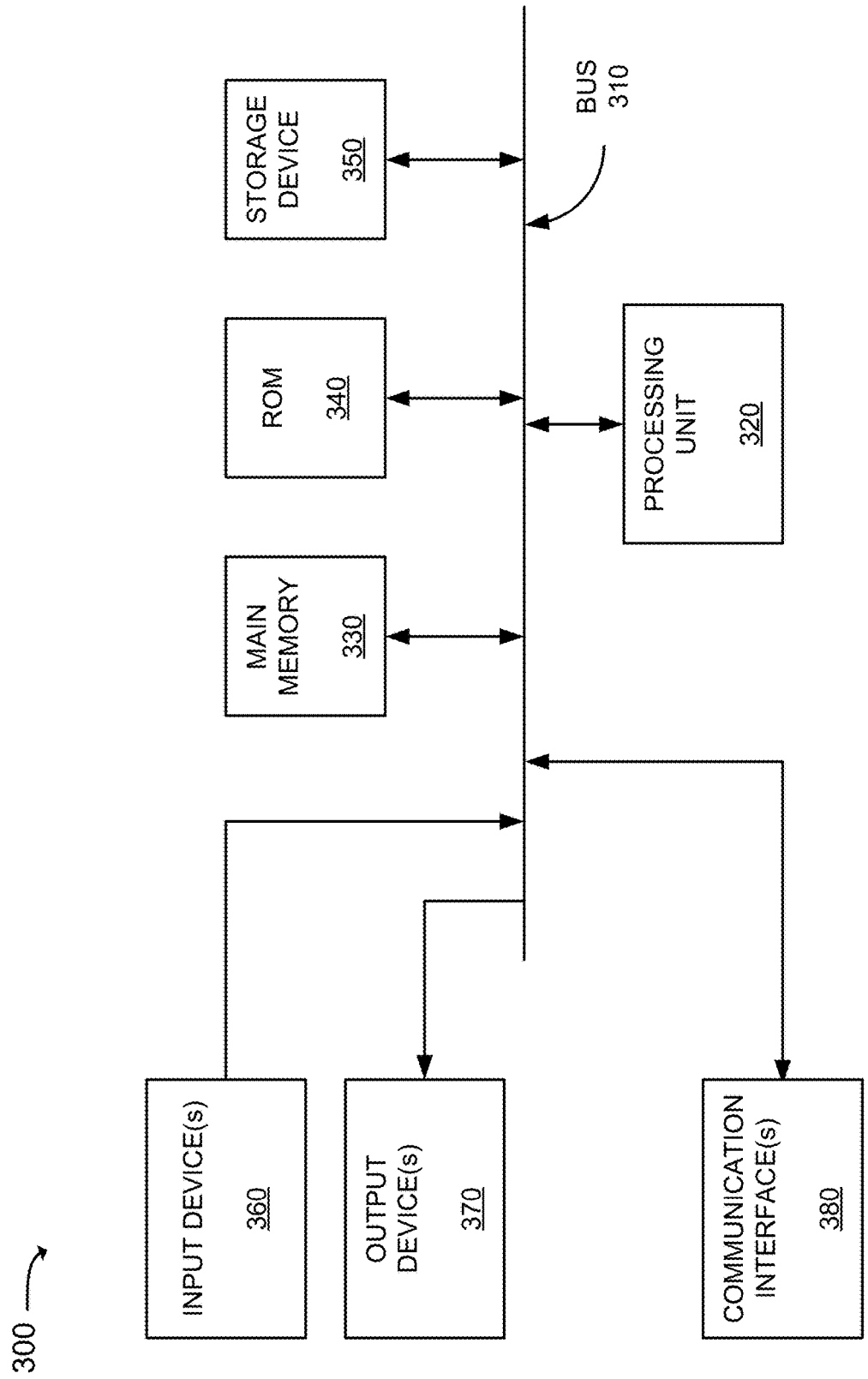
FIG. 3 depicts exemplary components of a network device that may correspond to one or more of the devices of the system of FIG. 1.

FIG. 3 depicts exemplary components of a network device 300. CMP server 120, small cell wireless stations 105, SeGW 125, validation entity 135, and provisioning system 140 may each include a device or devices similar to network device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 includes a path that permits communication among the components of device 300. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340 and storage device 350 may each be referred to herein as a "non-transitory computer-readable medium" or a "non-transitory storage medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator or user, including a display (e.g., with a touch sensitive panel), a speaker, etc. Input device 360 and output device 370 may be implemented as a graphical user interface (GUI) (e.g., a touch screen GUI that uses any type of touch screen device) that displays GUI information and which receives user input via the GUI. Communication interface(s) 380 may include a transceiver that enables device 300 to communicate with other devices and/or systems. For example, communication interface(s) 380 may include wired and/or wireless transceivers for communicating via public network(s) 115 or controlled access network 130. In the case of device 300 being a small cell wireless station 105, communication interface(s) 380 may include a wireless transceiver for communicating with one or more devices 110 within the small cell, and a wired transceiver for communicating with public network 115.

The configuration of components of network device 300 shown in FIG. 3 is for illustrative purposes. Other configurations may be implemented. Therefore, network device 300 may include additional, fewer and/or different components, arranged in a different configuration, than depicted in FIG. 3. For example, a small cell wireless station 105 may include similar components to those shown in FIG. 3 but may omit input device(s) 360 and/or output device(s) 370.

Figure 4:
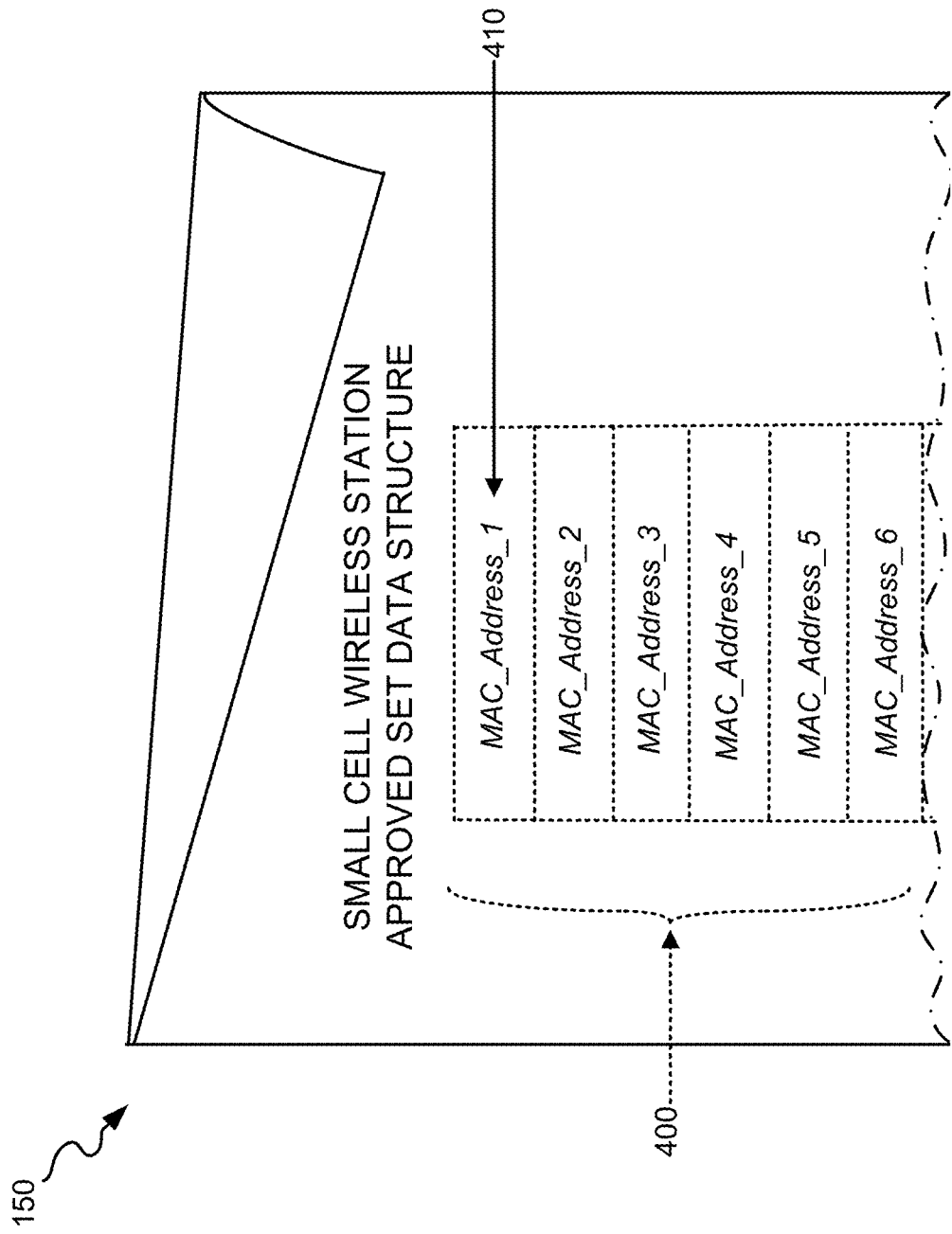
FIG. 4 depicts an exemplary implementation of a small cell wireless station approved set data structure.

FIG. 4 depicts an exemplary implementation of a small cell wireless station approved set data structure 150. Small cell wireless station approved set data structure 150 includes, among other data, a list 400 of network addresses 410 (MAC addresses shown by way of example) associated with small cell wireless stations 105 that are authorized to access a particular controlled access network 130. Inclusion of a network address 410 in approved set data structure 150 indicates that the corresponding small cell wireless station 105 has been authorized to access the controlled access network 130 associated with the approved set data structure 150. A different small cell wireless station approved set data structure 150 may, in some implementations, be associated with each one of multiple different controlled access networks 130. Small cell wireless station approved set data structure 150 may be stored in a memory device at validation entity 135, or in an external memory device located in controlled access network 130 or public network 115 that is accessible by validation entity 135.

Figure 5:
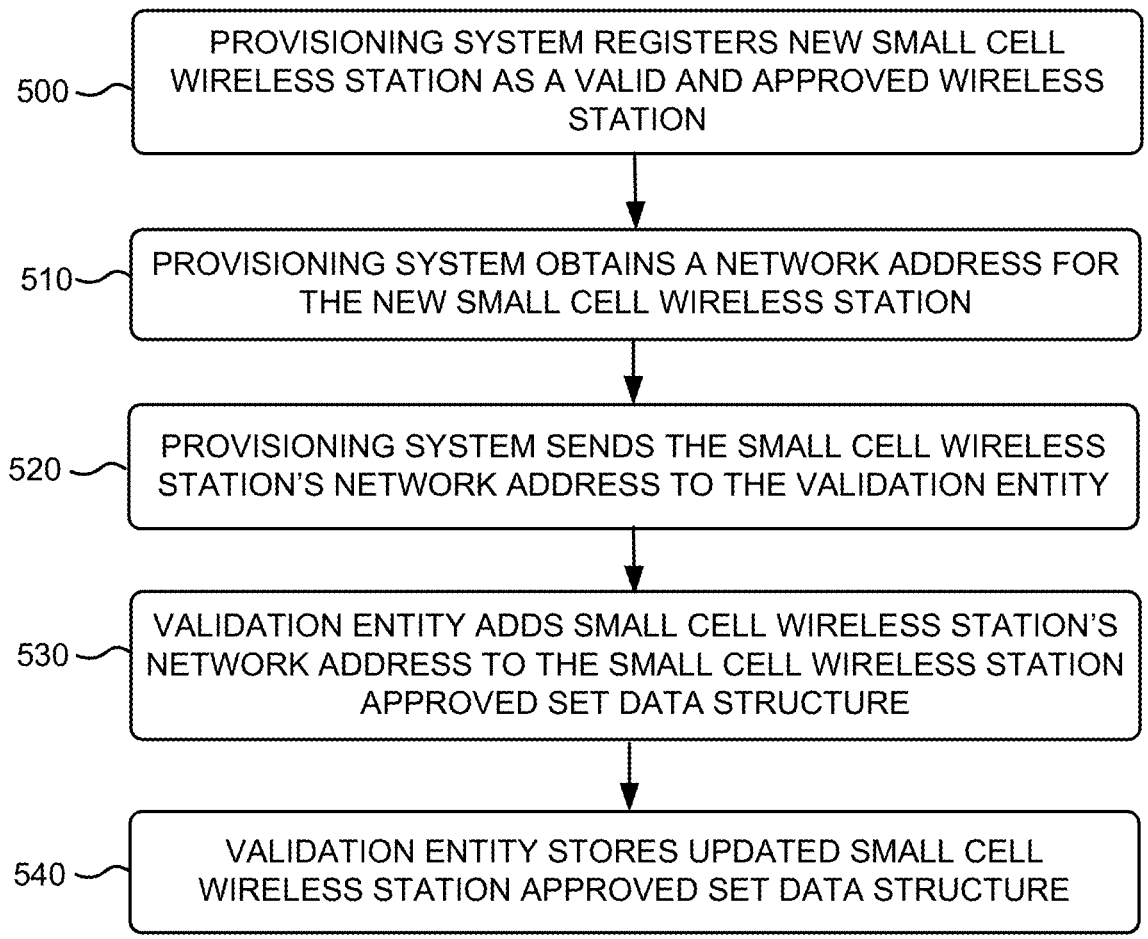
FIG. 5 illustrates an exemplary process for registering a new small cell wireless station for authorized access to the controlled access network and adding the new small cell wireless station to the small cell wireless station approved set data structure.

FIG. 5 illustrates an exemplary process for registering a new small cell wireless station 105 for authorized access to controlled access network 130 and adding the network address of the new small cell wireless station 105 to small cell wireless station approved set data structure 150. The exemplary process of FIG. 5 may, for example, be implemented by provisioning system(s) 140 in conjunction with validation entity 135. The exemplary process of FIG. 5 is described below with reference to the exemplary messaging/operations diagram of FIG. 6.

Figure 6:
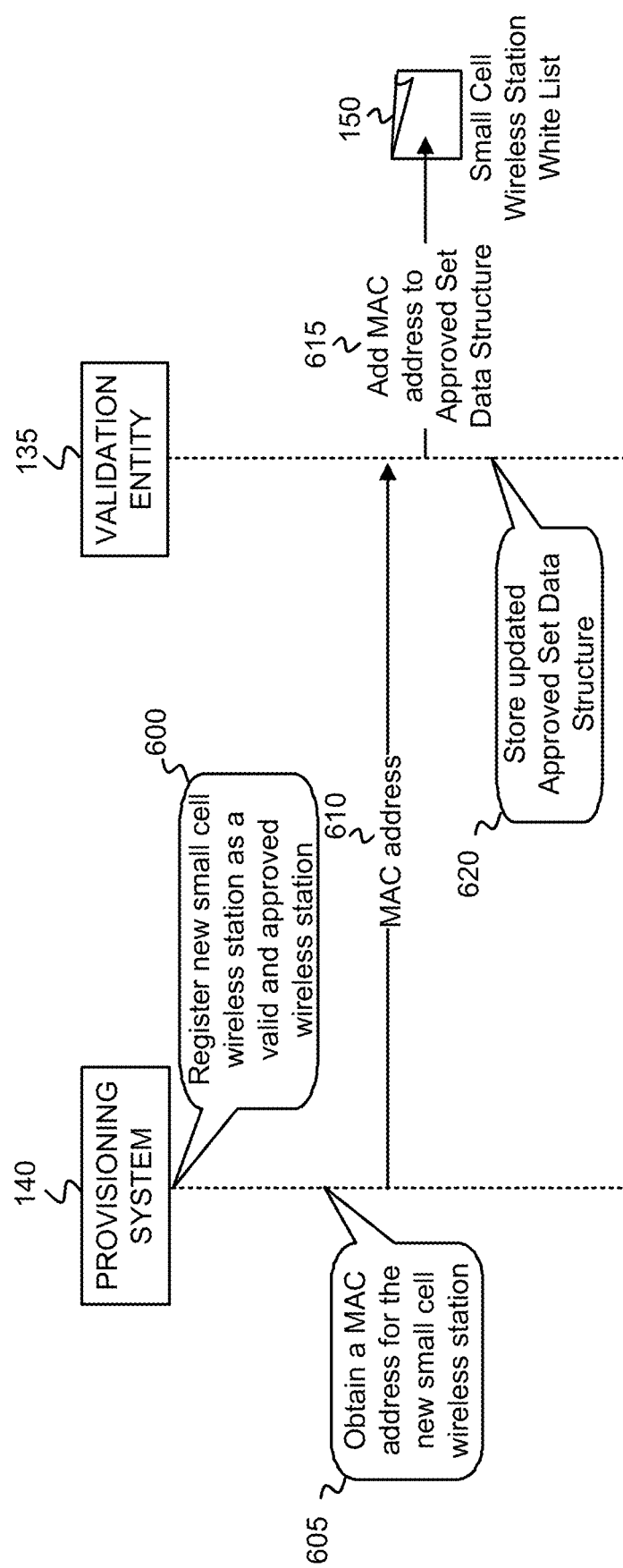
FIG. 6 is an exemplary operations/messaging diagram associated with the exemplary process of FIG. 5.

The exemplary process includes provisioning system 140 registering a new small cell wireless station 105 as a valid wireless station (block 500). The network service provider of controlled access network 130 may wish to add a new small cell wireless station 105 at a particular geographic location for providing small cell (e.g., femtocell) coverage to devices 110. An administrator logs into provisioning system 140 and enters registration information for the new, valid and authorized, small cell wireless station 105 (e.g., a device label or name, a network address (e.g., MAC address), geographic coordinates of the small cell wireless station, etc.). FIG. 6 depicts provisioning system 140 registering 600 a new small cell wireless station 105 as a valid wireless station.

Provisioning system 140 obtains a network address for the new small cell wireless station (block 510) and sends the small cell wireless station 105's network address to validation entity 135 (block 520). In some circumstances, the network address of the new small cell wireless station may be manually provided in block 500. In other circumstances, the provisioning system 140 may query the small cell wireless station 105, or another node that maintains network address information, to retrieve the network address (e.g., MAC address) of the new small cell wireless station 105. FIG. 6 depicts provisioning system 140 obtaining 605 a network address (e.g., a MAC address) for the new small cell wireless station 105, and sending a message 610 that includes the network address (e.g., MAC address) of the small cell wireless station 105 to validation entity 135.

Validation entity 135, upon receipt of the network address from provisioning system 140, adds the small cell wireless station 105's network address to small cell wireless station approved set data structure 150 (block 530), and stores the updated small cell wireless station approved set data structure 150 (block 540). Referring to the exemplary small cell wireless station approved set data structure 150 of FIG. 4, validation entity 135 (not shown) adds the new small cell wireless station 105's network address 410 to the list 400 of small cell wireless station network address stored in the list 400. FIG. 6 depicts validation entity 135 adding 615 the small cell wireless station 105's network address (e.g., MAC address) to small cell wireless station approved set data structure 150 and storing 620 the updated approved set data structure 150.

The exemplary process of FIG. 5 may be repeated for each new small cell wireless station to be registered as an authorized small cell wireless station for accessing controlled access network 130.

Figure 7:
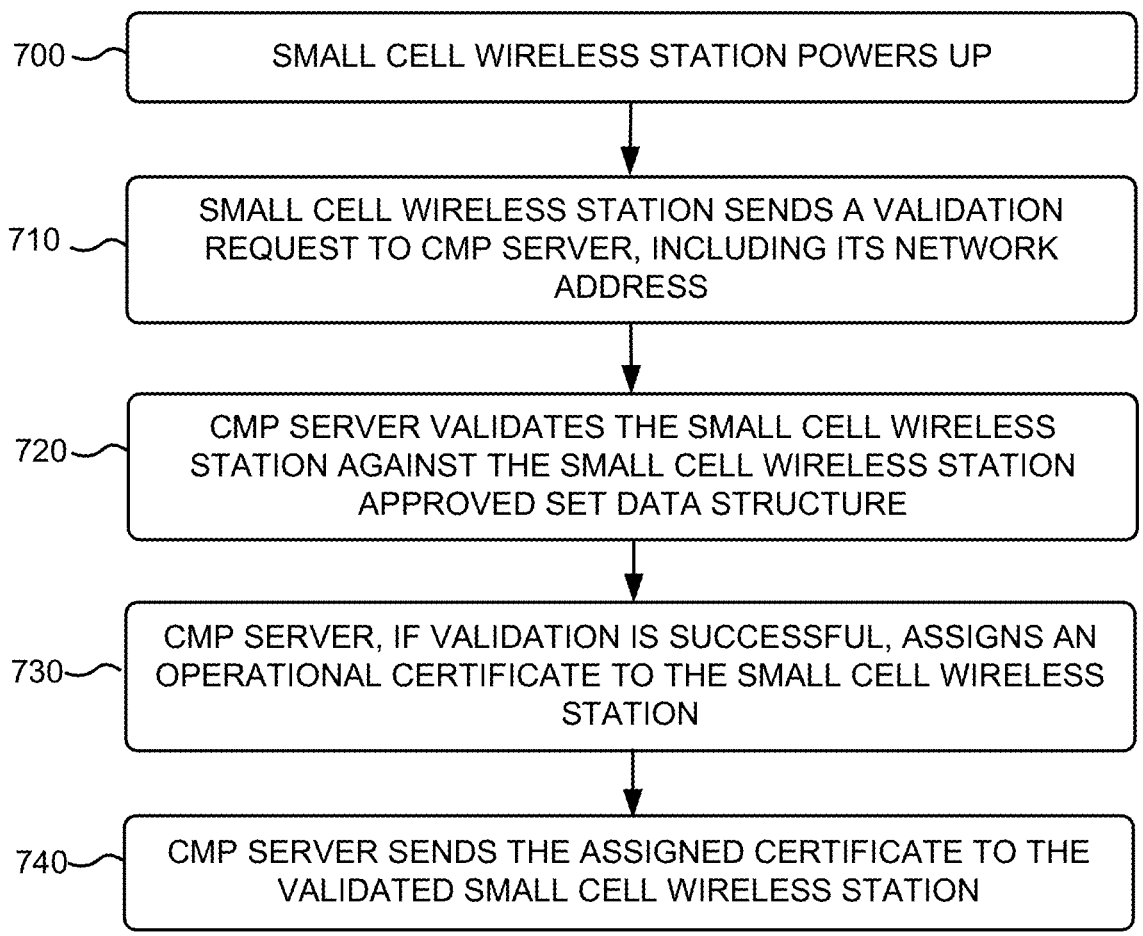
FIG. 7 illustrates an exemplary process for validating a small cell wireless station and issuing an operational certificate to the validated small cell wireless station for use in accessing the controlled access network.

FIG. 7 illustrates an exemplary process for validating a small cell wireless station 105 and issuing an operational certificate to the validated small cell wireless station 105 for use in accessing controlled access network 130. The exemplary process of FIG. 7 may be implemented by small cell wireless station 105 in conjunction with CMP server 120. The exemplary process of FIG. 7 is described below with reference to the exemplary messaging/operations diagram of FIG. 8.

Figure 8:
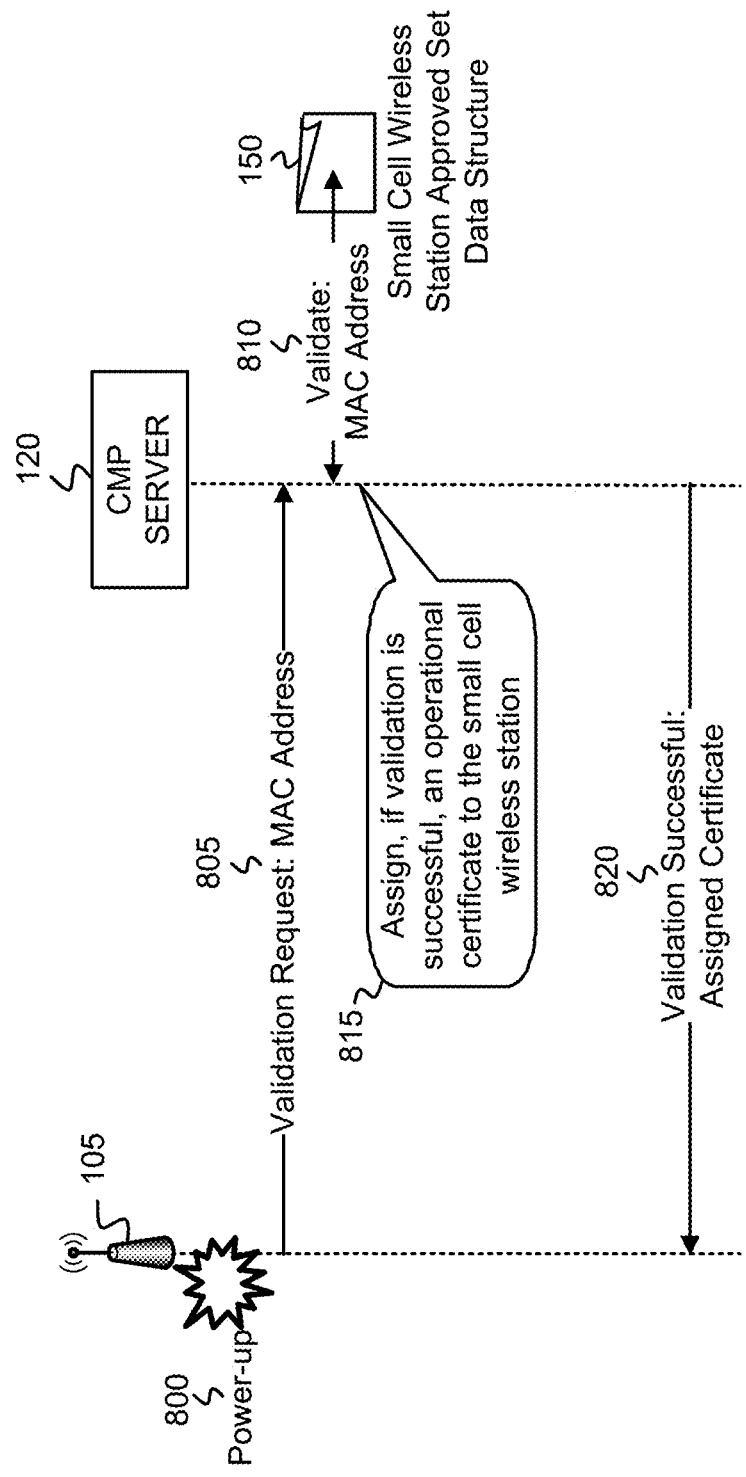
FIG. 8 is an exemplary operations/messaging diagram associated with the exemplary process of FIG. 7.

The exemplary process includes small cell wireless station 105 powering up from a powered down state (block 700), and sending a validation request to CMP server 120, including small cell wireless station 105's network address (e.g., MAC address) (block 710). Small cell wireless station 105, after initially being connected to public network 115, may power up for a first time and then seek validation and authentication from CMP server 120 so as to access controlled access network 130. FIG. 8 depicts small cell wireless station 105 powering-up 800, and then sending a validation request 805, which includes the wireless station 105's MAC address, to CMP server 120.

CMP server 120, upon receipt of the validation request, validates the small call wireless station 105 against the small cell wireless station approved set data structure 150 (block 720). CMP server 120 validates the small cell wireless station 105 against small cell wireless station approved set data structure 150 by sending the network address of the small cell wireless station 105 to validation entity 135. Validation entity 135 then searches through the list of network addresses contained in approved set data structure 150 to compare each network address in approved set data structure 150 with the small cell wireless station 105's network address and identify whether there is a matching network address. If a matching network address is found in approved set data structure 150, then the small cell wireless station 105 is considered to be successfully validated. If no matching network address is found in approved set data structure 105, then the small cell wireless station 105 is considered not to be successfully validated. FIG. 8 depicts CMP server 120 validating 810 the small cell wireless station 105's MAC address against the small cell wireless station approved set data structure 150.

CMP server 120, if the validation is successful, assigns an operational certificate to the small cell wireless station 105 (block 730), and sends the assigned certificate to the validated small cell wireless station 105 (block 740). In one implementation, CMP server 120 may obtain the operational certificate from a Certificate Authority (CA) and assign it to the small cell wireless station 105. FIG. 8 depicts CMP server 120 assigning 815, if the validation is successful, an operation certificate to the small cell wireless station 105, and sending a validation successful notification 820 that includes the assigned certificate. If validation is not successful (not shown in either FIG. 7 or FIG. 8), then CMP server 120 may return a validation error message to small cell wireless station 105. Additionally, or alternatively, CMP server 120 may return the validation error, along with the small cell wireless station 105's network address, to provisioning system 140.

Figure 9:
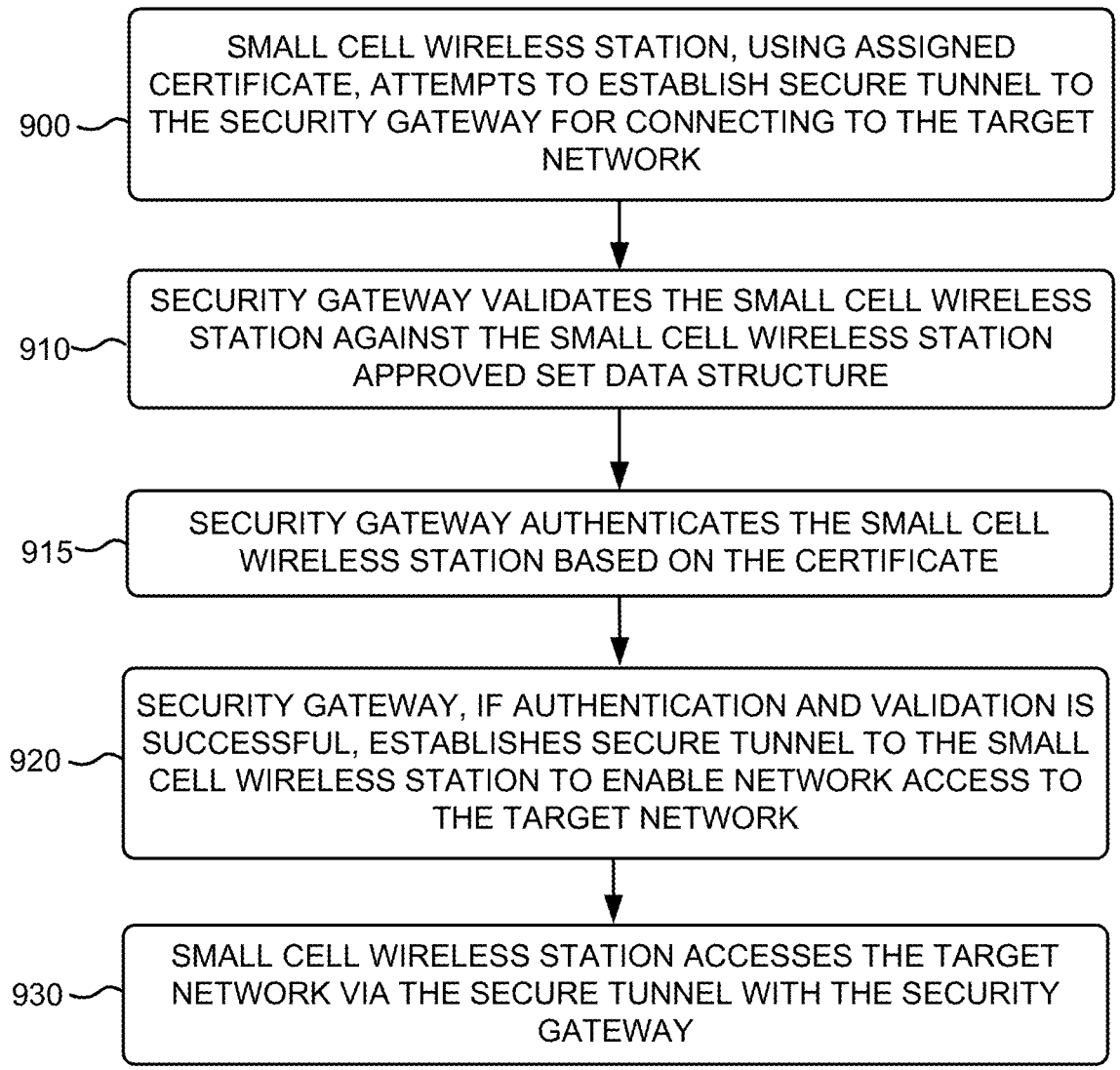
FIG. 9 illustrates an exemplary process for authenticating a small cell wireless station using the small cell wireless station approved set data structure and establishing a secure tunnel from the small cell wireless station to the controlled access network via the security gateway to enable the small cell wireless station to access the controlled access network.

FIG. 9 illustrates an exemplary process for authenticating a small cell wireless station 105 using small cell wireless station approved set data structure 150 and establishing a secure tunnel from the small cell wireless station 105 to controlled access network 130 via SeGW 125 to enable small cell wireless station 105 to access controlled access network 130. The exemplary process of FIG. 9 may be implemented by small cell wireless station 105 in conjunction with SeGW 125. The exemplary process of FIG. 9 is described below with reference to the exemplary messaging/operations diagram of FIG. 10.

Figure 10:
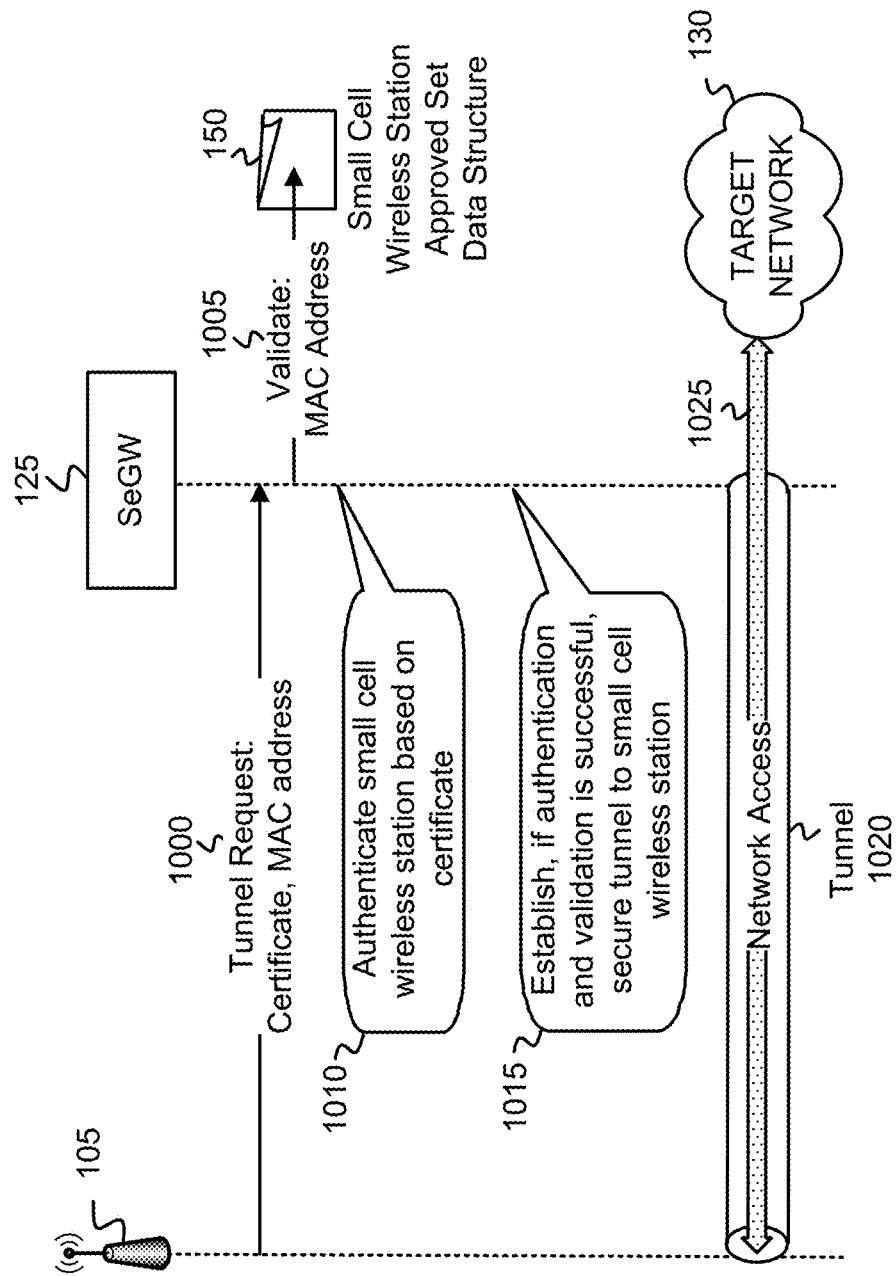
FIG. 10 is an exemplary operations/messaging diagram associated with the exemplary process of FIG. 9.

The exemplary process includes small cell wireless station 105, using the assigned certificate, attempting to establish a secure tunnel to the SeGW 125 for connecting to the target network (e.g., controlled access network 130) (block 900). Small cell wireless station 105 attempts to establish a tunnel to SeGW 125 by, as depicted in FIG. 10, sending a tunnel request message 1000 to SeGW 125 that includes the small cell wireless station 105's network address (e.g., MAC address) and the assigned certificate.

SeGW 125 validates the small cell wireless station 105 against the small cell wireless station approved set data structure 150 (block 910), and authenticates the small cell wireless station 105 based on the certificate of the small cell wireless station 105 (block 915). SeGW 125 validates the small cell wireless station 105 against small cell wireless station approved set data structure 150 by, as previously described, comparing the small cell wireless station 105's network address with network addresses stored in approved set data structure 150 to find a matching network address. If a matching network address is found in approved set data structure 150, then small cell wireless station 105 is considered to be successfully validated. SeGW 125 authenticates the small cell wireless station 105, based on the certificate, using an existing certificate-based authentication process. FIG. 10 depicts SeGW 125 validating 1005 the network address (e.g., MAC address) of the small cell wireless station 105 against the small cell wireless station approved set data structure 150, and SeGW 125 authenticating 1010 the small cell wireless station 105 based on the certificate received in tunnel request 1000.

SeGW 125 establishes 1015, if the authentication and the validation is successful, a secure tunnel 1020 to the small cell wireless station 105 to enable network access to the target network (e.g., controlled access network 130) (block 920). The secure tunnel may be a bi-directional tunnel, with the tunnel establishing the secure conveying of traffic from small cell wireless station 105 to SeGW 125, and from SeGW 125 to small cell wireless station 105. In one implementation, the secure tunnel may be an Internet Protocol Security (IPSec) tunnel in which traffic (e.g., packets) sent between the small cell wireless station 105 and the SeGW 125 is encrypted over the tunnel using the IPSec protocol. In other implementations, different techniques, other than IPSec, may be used for establishing a secure tunnel between small cell wireless station 105 and SeGW 125. FIG. 10 depicts SeGW 125 establishing, if the authentication and validation is successful, a secure tunnel 1025 from SeGW 125 to small cell wireless station 105 to enable network access 1025 by small cell wireless station 105 with target network 130. In a case where authentication and/or validation of the small cell wireless station 105 is unsuccessful, SeGW 125 may return a tunnel establishment failure message to the small cell wireless station 105. Additionally, or alternatively, SeGW 125 may return a tunnel establishment failure message that includes the small cell wireless station 105's network address, to provisioning system 140.

Small cell wireless station 105 accesses the target network via the secure tunnel with SeGW 125 (block 930). For example, using existing encryption techniques, small cell wireless station 105 may send data traffic via the secure tunnel (e.g., IPSec tunnel) to SeGW 125, which then conveys the data traffic towards its destination in controlled access network 130. Additionally, SeGW 125 may receive data traffic from controlled access network 130 that is destined for small cell wireless station 105 and, using existing encryption techniques, forwards the data traffic to the small cell wireless station 105 via the secure tunnel (e.g., IPSec tunnel). FIG. 10 depicts small cell wireless station 105 engaging in network access 1025 with the target network 130 via the established secure tunnel 1020.

Figure 11:
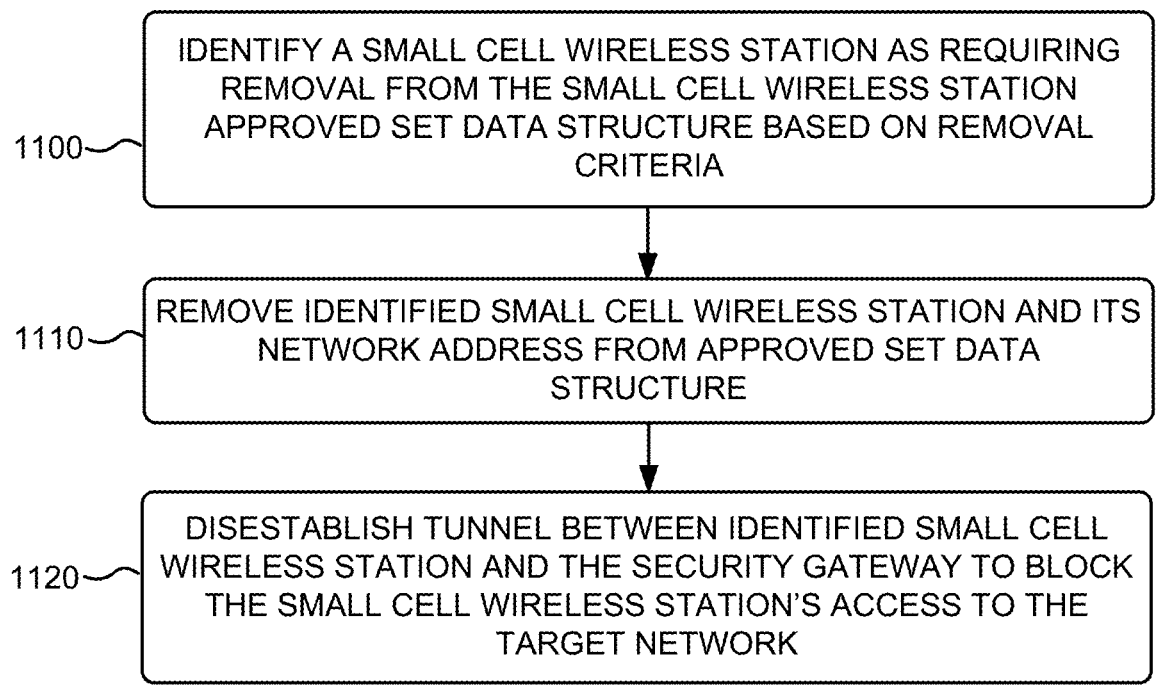
FIG. 11 illustrates an exemplary process for removing a small cell wireless station from the small cell wireless station approved set data structure so as to remove its ability to access the controlled access network.

FIG. 11 illustrates an exemplary process for removing a small cell wireless station 105 from the small cell wireless station approved set data structure 150 so as to remove its ability to access controlled access network 130. The exemplary process of FIG. 11 may be implemented by provisioning system 140, CMP server 120, SeGW 125, and/or validation entity 135. The exemplary process of FIG. 11 is described below with reference to the exemplary messaging/operations diagram of FIG. 12.

Figure 12:
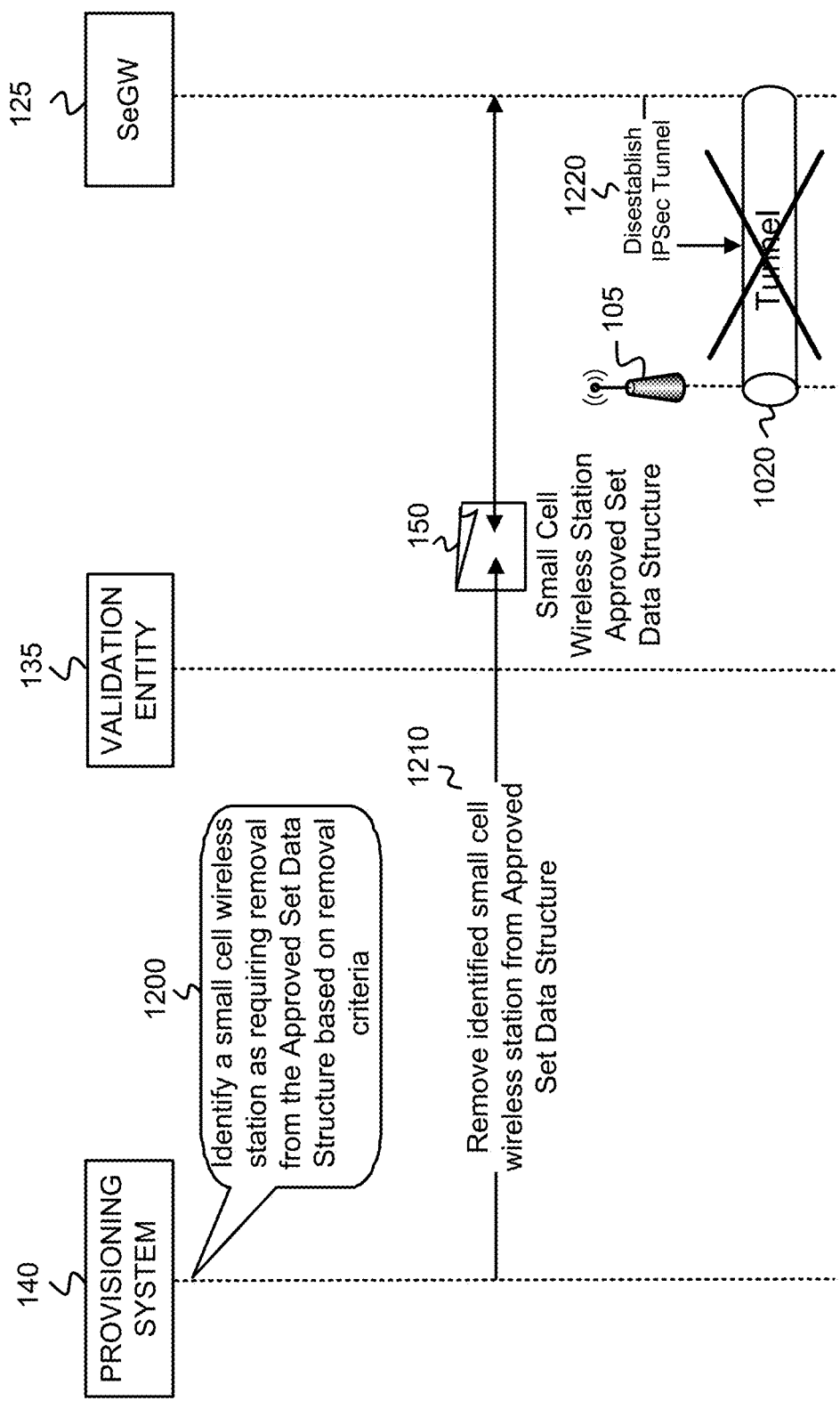
FIG. 12 is an exemplary operations/messaging diagram associated with the exemplary process of FIG. 11.

The exemplary process includes a small cell wireless station 105 being identified as requiring removal from approved set data structure 150 based on a set of removal criteria (block 1100). The set of removal criteria may include any number of criteria, that when applied to small cell wireless station 105, require removal of its network address from small cell wireless station approved set data structure 105. Such criteria may include, but are not limited to, outstanding unpaid balances on a customer account associated with the particular small cell wireless station 105, network security issues identified in association with the operation of the small cell wireless station 105, the alteration of geographic wireless coverage including changing a location of the small cell wireless station 105, etc. In one circumstance, provisioning system 140 may identify a small cell wireless station 105 as needing removal from approved set data structure 150 due to, for example, suspension of a customer account that is associated with the small cell wireless station 105 (i.e., the small cell wireless station 105 is located on the customer's premises). In another circumstance, SeGW 125 may identify a small cell wireless station 105 as requiring removal of its network address from small cell wireless station approved set data structure 150 based on the identification of network security issues involving the small cell wireless station 105. FIG. 12 depicts an example in which provisioning system 140 identifies 1200 a small cell wireless station 105 as requiring removal from approved set data structure 150 based on a set of removal criteria.

The identified small cell wireless station 105's network address may be removed from small cell wireless station approved set data structure 150 (block 1110). Referring to the example approved set data structure 150 of FIG. 4, a particular small cell wireless station 105's network address (e.g., MAC address) may be removed from the list 400. FIG. 12 depicts an example in which provisioning system 140 removes 1210 the identified small cell wireless station from small cell wireless station approved set data structure 150.

The tunnel, between the identified small cell wireless station 105 and the security gateway 125, may be disestablished (e.g., torn down) to block the small cell wireless station 105's access to the target network (e.g., controlled access network 130) (block 1120). SeGW 125, based on removal of the small cell wireless station 105's network address from approved set data structure 150, may disestablish the secure tunnel between the small cell wireless station 105 and SeGW 125. FIG. 12 depicts SeGW 125 disestablishing 1220 the tunnel 1020 between small cell wireless station 105 and SeGW 125, thereby also disconnecting small cell wireless station 105 from, and preventing network access (shown graphically with an "X" across the tunnel 1020) to, controlled access network 130.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method to be executed on a processor of a network device, comprising:
receiving, by the network device from a network service provider provisioning system, a first network address of a first small cell wireless station that is associated with a customer account and has been registered as an authorized wireless station for network access to a target network via a gateway;
adding, by the network device, the first network address of the first small cell wireless station to a small cell wireless station data structure that lists a plurality of network addresses that differ from the first network address and are associated with a plurality of small cell wireless stations that differ from the first small cell wireless station and that are authorized for the network access to the target network via the gateway;

validating, by the network device and responsive to an initial power-up of the first small cell wireless station from a powered-down state, the first small cell wireless station against the small cell wireless station data structure to locate a match to the first network address;

selectively establishing, based on the validating, a first tunnel, between the first small cell wireless station and the gateway connected to the target network, to enable the network access to the target network; and maintaining the first tunnel until the first network address is removed, based on an application of a set of removal criteria applied to the first small cell wireless station, from the small cell wireless station data structure, wherein the set of removal criteria includes suspension of the customer account, a network security issue, and a geographic location of the first small cell wireless station.

2. The method of claim 1, wherein the first network address of the first small cell wireless station comprises a Medium Access Control (MAC) address.

3. The method of claim 1, wherein the first tunnel comprises an Internet Protocol Security (IPSec) tunnel.

4. The method of claim 1, further comprising:
receiving, at the gateway, first network traffic from the first small cell wireless station via the first tunnel and conveying the first network traffic to the target network; and
receiving, at the gateway, second network traffic from the target network and conveying the second network traffic to the first small cell wireless station via the first tunnel.

5. The method of claim 1, further comprising:
receiving a second network address of a second small cell wireless station that has been registered as an authorized wireless station for network access with the target network;
adding the second network address of the second small cell wireless station to the small cell wireless station data structure; and
validating, upon power-up of the second small cell wireless station, the second small cell wireless station against the small cell wireless station data structure to selectively establish a second tunnel, between the second small cell wireless station and the gateway connected to the target network, to enable network access to the target network.

6. The method of claim 1, wherein the target network comprises a controlled or restricted access network.

7. The method of claim 6, wherein the controlled or restricted access network comprises a Public Land Mobile Network or a satellite network.

8. The method of claim 1, further comprising:
receiving a request to establish the first tunnel from the first small cell wireless station, wherein the request includes the first network address and a first certificate assigned to the first small cell wireless station;
validating the first small cell wireless station against the small cell wireless station data structure by comparing the first network address to the plurality of network addresses associated with the plurality of authorized small cell wireless stations;

authenticating the first small cell wireless station based on the first certificate; and
establishing the first tunnel between the first small cell wireless station and the gateway connected to the target network based on a successful validation and a successful authentication.

9. One or more network devices, comprising:
a memory device configured to store a small cell wireless station data structure;
a communication interface configured to receive a first network address of a first small cell wireless station that is associated with a customer account and has been registered with a network service provider as an authorized wireless station for network access to a target network via a gateway; and
at least one processing unit configured to:
add the first network address of the first small cell wireless station to the small cell wireless station data structure, wherein the small cell wireless station data structure lists a plurality of network addresses that differ from the first network address and are associated with a plurality of small cell wireless stations that differ from the first small cell wireless station and that are authorized for the network access to the target network via the gateway,
validate, responsive to an initial power-up of the first small cell wireless station from a powered-down state, the first small cell wireless station against the small cell wireless station data structure to locate a match to the first network address,
selectively establish, based on the validation, a first tunnel, between the first small cell wireless station and the gateway connected to the target network, to enable the network access to the target network, and
maintain the first tunnel until the first network address is removed, based on an application of a set of removal criteria applied to the first small cell wireless station, from the small cell wireless station data structure, wherein the set of removal criteria includes suspension of the customer account, a network security issue, and a geographic location of the first small cell wireless station.

10. The one or more network devices of claim 9, wherein the first network address of the first small cell wireless station comprises a Medium Access Control (MAC) address.

11. The one or more network devices of claim 9, wherein the first tunnel comprises an Internet Protocol Security (IPSec) tunnel.

12. The one or more network devices of claim 9, wherein the at least one processing unit is further configured to:
receive first network traffic from the first small cell wireless station via the first tunnel and convey the first network traffic to the target network; and
receive second network traffic from the target network and conveying the second network traffic to the first small cell wireless station via the first tunnel.

13. The one or more network devices of claim 9, wherein the communication interface is further configured to receive a second network address of a second small cell wireless station that has been registered as an authorized wireless station for network access with the target network, and
wherein the at least one processing unit is further configured to:
add the second network address of the second small cell wireless station to the small cell wireless station data structure, and validate, upon power-up of the second small cell wireless station, the second small cell wireless station against the small cell wireless station data structure to selectively establish a second tunnel, between the second small cell wireless station and the gateway connected to the target network, to enable network access to the target network.

14. The one or more network devices of claim 9, wherein the target network comprises a controlled or restricted access network.

15. The one or more network devices of claim 14, wherein the controlled or restricted access network comprises a Public Land Mobile Network or a satellite network.

16. The one or more network devices of claim 9, wherein the communication interface is further configured to receive a request to establish the first tunnel from the first small cell wireless station, wherein the request includes the first network address and a first certificate assigned to the first small cell wireless station, and
  wherein the at least one processing unit is further configured to:
    validate the first small cell wireless station against the small cell wireless station data structure by comparing the first network address to the plurality of network addresses associated with the plurality of authorized small cell wireless stations,
    authenticate the first small cell wireless station based on the first certificate, and
    establish the first tunnel between the first small cell wireless station and the gateway connected to the target network based on a successful validation and a successful authentication.

17. A non-transitory storage medium storing instructions executable by a network device, wherein the instructions comprise instructions to cause the network device to:
  receive a first network address of a first small cell wireless station that is associated with a customer account and has been registered as an authorized wireless station for network access to a target network via a gateway;
  add the first network address of the first small cell wireless station to a small cell wireless station data structure that lists a plurality of network addresses that differ from the first network address associated with a plurality of small cell wireless stations that differ from the first small cell wireless station and that are authorized for the network access to the target network via the gateway;
  validate, responsive to an initial power-up of the first small cell wireless station from a powered-down state, the first small cell wireless station against the small cell wireless station data structure to locate a match to the first network address;
  selectively establish, based on the validation, a tunnel, between the first small cell wireless station and the gateway connected to the target network, to enable the network access to the target network; and
  maintain the tunnel until the first network address is removed, based on application of a set of removal criteria applied to the first small cell wireless station, from the small cell wireless station data structure, wherein the set of removal criteria includes suspension of the customer account, a network security issue, and a geographic location of the first small cell wireless station.

18. The non-transitory storage medium of claim 17, wherein the instructions comprise instructions to cause the network device to:
  receive a request to establish the tunnel from the first small cell wireless station, wherein the request includes the network address and a first certificate assigned to the first small cell wireless station;
  validate the first small cell wireless station against the small cell wireless station data structure by comparing the first network address to the plurality of network addresses associated with the plurality of authorized small cell wireless stations;
  authenticate the first small cell wireless station based on the first certificate; and
  establish the tunnel between the first small cell wireless station and the gateway connected to the target network based on a successful validation and a successful authentication.

19. The non-transitory storage medium of claim 18, wherein the first network address of the first small cell wireless station comprises a Medium Access Control (MAC) address, wherein the tunnel comprises an Internet Protocol Security (IPSec) tunnel, and wherein the target network comprises a controlled, or restricted, access network.

20. The non-transitory storage medium of claim 17, wherein the instructions comprise instructions to cause the network device to:
  receive first network traffic from the first small cell wireless station via the tunnel and conveying the first network traffic to the target network; and
  receive second network traffic from the target network and conveying the second network traffic to the first small cell wireless station via the tunnel.

* * * * *